(12) United States Patent
Matsuo et al.

(10) Patent No.: US 7,338,917 B2
(45) Date of Patent: Mar. 4, 2008

(54) PURIFICATION CATALYST FOR EXHAUST GAS

(75) Inventors: Yuichi Matsuo, Wako (JP); Kazunori Kiguchi, Wako (JP); Norihiko Suzuki, Wako (JP); Atsushi Furukawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/074,993

(22) Filed: Mar. 7, 2005

(65) Prior Publication Data

US 2005/0221979 A1   Oct. 6, 2005

(30) Foreign Application Priority Data

Mar. 30, 2004   (JP)   ............... 2004-099642

(51) Int. Cl.
B01J 23/02 (2006.01)
B01J 23/42 (2006.01)
B01J 23/44 (2006.01)
B01J 23/58 (2006.01)
B01J 21/04 (2006.01)

(52) U.S. Cl. .................. 502/330; 502/339; 502/353; 502/439; 502/525

(58) Field of Classification Search ............ 502/330, 502/339, 353, 439, 525
See application file for complete search history.

(56) References Cited

U.S. PATENT DOCUMENTS

| | | | |
|---|---|---|---|
| 4,049,583 A * | 9/1977 | Lauder ................. 502/303 |
| 4,110,254 A * | 8/1978 | Lauder ................. 502/303 |
| 4,134,852 A * | 1/1979 | Volin .................. 502/302 |
| 4,151,123 A * | 4/1979 | McCann, III .......... 502/303 |
| 4,257,921 A * | 3/1981 | Slinkard et al. ....... 502/302 |
| 4,454,363 A * | 6/1984 | Teng et al. ........... 585/428 |
| 4,480,050 A * | 10/1984 | Brennan ............... 502/330 |
| 4,544,470 A | 10/1985 | Hetrick |
| 4,812,300 A * | 3/1989 | Quinlan et al. ........ 423/404 |
| 4,956,327 A * | 9/1990 | Erekson et al. ........ 502/216 |
| 5,149,516 A * | 9/1992 | Han et al. ............ 423/418.2 |
| 5,157,007 A | 10/1992 | Domesle et al. |
| 5,514,354 A | 5/1996 | Domesle et al. |
| 5,559,073 A * | 9/1996 | Hu et al. ............. 502/302 |
| 5,591,688 A * | 1/1997 | Blum et al. ........... 502/330 |
| 5,943,547 A * | 8/1999 | Yamamichi et al. ..... 438/3 |
| 6,060,420 A * | 5/2000 | Munakata et al. ...... 502/302 |
| 6,383,977 B1 * | 5/2002 | Karim et al. .......... 502/311 |
| 6,395,676 B2 * | 5/2002 | Blum et al. ........... 502/330 |
| 6,518,216 B1 * | 2/2003 | Han et al. ............ 502/215 |

(Continued)

FOREIGN PATENT DOCUMENTS

DE   39 40 458   6/1991

(Continued)

*Primary Examiner*—Cam N. Nguyen
(74) *Attorney, Agent, or Firm*—Hamre, Schumann, Mueller & Larson, P.C.

(57) ABSTRACT

A purification catalyst for exhaust gas enhances the activity for each precious metal by effectively utilizing the precious metal without incurring a high production cost, thereby improving endurance. The purification catalyst for exhaust gas comprises a composite oxide supporting Pd, the composite oxide has a rational formula $MXO_3$ in which M is an alkali metal element and X is an element in group 5 in periodic table, and a perovskite crystal structure.

4 Claims, 1 Drawing Sheet

U.S. PATENT DOCUMENTS

| | | | |
|---|---|---|---|
| 6,569,803 B2 * | 5/2003 | Takeuchi | 502/328 |
| 6,696,596 B1 * | 2/2004 | Herzog et al. | 560/245 |
| 6,740,620 B2 * | 5/2004 | Bogan et al. | 502/300 |
| 6,770,256 B1 * | 8/2004 | Kaliaguine et al. | 423/593.1 |
| 6,794,330 B2 * | 9/2004 | Tanada et al. | 502/261 |
| 6,797,413 B2 * | 9/2004 | Takeishi et al. | 428/690 |
| 6,797,663 B2 * | 9/2004 | Watanabe et al. | 502/66 |
| 6,811,868 B2 * | 11/2004 | Hasegawa et al. | 428/325 |
| 6,818,582 B2 * | 11/2004 | Maunula | 502/73 |
| 6,822,127 B2 * | 11/2004 | Dai et al. | 585/259 |
| 6,867,452 B2 * | 3/2005 | Hayashi et al. | 257/310 |
| 6,899,744 B2 * | 5/2005 | Mundschau | 95/56 |
| 6,919,472 B2 * | 7/2005 | Hazin et al. | 558/321 |
| 2001/0012698 A1 * | 8/2001 | Hayashi et al. | 438/782 |
| 2001/0016554 A1 | 8/2001 | Takeuchi | |
| 2002/0019092 A1 * | 2/2002 | Arita et al. | 438/240 |
| 2003/0052357 A1 * | 3/2003 | Hayashi et al. | 257/310 |
| 2004/0058797 A1 * | 3/2004 | Nonoyama et al. | 501/134 |
| 2006/0050833 A1 * | 3/2006 | Ichikawa et al. | 376/305 |

FOREIGN PATENT DOCUMENTS

| | | |
|---|---|---|
| EP | 1 118 375 | 12/1984 |
| EP | 0 738 539 | 10/1996 |
| JP | 05-086259 | 4/1993 |
| JP | 2001-198463 | 7/2001 |
| JP | 2003-175337 | 6/2003 |

* cited by examiner

PURIFICATION CATALYST FOR EXHAUST GAS

BACKGROUND OF THE INVENTION

1. Field of the Invention

The present invention relates to a purification catalyst for exhaust gas, and specifically relates to a purification catalyst for exhaust gas in which nitrogen oxides (NOx), carbon hydride (HC), and carbon monoxide (CO) contained in an exhaust gas emitted from an internal combustion engine of an automobile or the like can be simultaneously and effectively reduced so that the exhaust gas is purified.

2. Related Art

For purifying exhaust gas containing, for example, CO, HC, and NO, precious metal elements (Pt, Rh, Pd and Ir) exhibit high performance. Therefore, it is preferable to employ the above-mentioned precious metal elements in the purification catalyst for exhaust gas. These precious metals are generally used by supporting one of them on $Al_2O_3$ of high surface-to-weight ratio. On the other hand, composite oxides (for example, a perovskite oxide), made by combining various elements, have extremely varied properties. Therefore, it is preferable for a purification catalyst for exhaust gas to employ the above-mentioned composite oxides. Moreover, when the precious metal is supported on the composite oxides, the properties of precious metal are significantly changed. From this viewpoint, a preferable performance for purifying exhaust gas can be obtained in the purification catalyst for exhaust gas in which a precious metal is supported on a composite oxide.

Various catalysts mentioned above are now being developed, and for example, a technique in which a cohesion rate of the precious metal can be reduced by providing a perovskite oxide as a support, judging from deterioration of the precious metal by reduction of active sites by cohesion of the precious metal, is proposed (see Japanese Unexamined Application Publication No. 5-86259). Moreover, another technique in which reduction of PdO can be reduced by using a perovskite oxide in which the A site is defective, judging from reducing PdO which is an activated species in a NO reduction reaction when the precious metal is Pd, whereby the PdO changes to Pd which has low activity, is proposed (see Japanese Unexamined Application Publication No. 2003-175337).

However, in the conventional purification catalyst for exhaust gas for automobiles, a large content of the precious metals (Pt, Rh, and Pd) are used in order to effectively purify CO, HC, and $NO_x$ emitted from automobiles. When large amounts of the precious metals are used as described above, the cost is simultaneously increased along with increase in catalyst performance. Therefore, the above-mentioned embodiment is not always effective. Accordingly, development of a purification catalyst for exhaust gas in which production cost is not high has been requested.

Moreover, the precious metals (for example, Pt, Rh, and Pd) are generally used in a condition of supporting one of them on $Al_2O_3$ which is a support having high surface-to-weight ratio. Therefore, these precious metals can be supported on $Al_2O_3$ in a highly dispersed condition. However, $Al_2O_3$ is a stable compound, and $Al_2O_3$ therefore does not interact with a supported precious metal. Therefore, activity for each precious metal cannot be improved, whereby high performance cannot be maintained after a long period of use or after exposure to a high temperature atmosphere. Accordingly, development is desired of a support, in which high performance can be maintained after a long period of use or after exposure to a high temperature atmosphere, that is, endurance can be improved, by effectively utilizing the precious metals, in other words, by improving the activity for each precious metal.

$Al_2O_3$ has no effect in which activity for each precious metal is improved because the surface of $Al_2O_3$ is extremely stable and is electrically stable, whereby $Al_2O_3$ does not electrically interact with the precious metal. Moreover, a reason that the endurance of the $Al_2O_3$ is low is as follows. That is, deterioration patterns of the precious metal catalyst (specifically, Pd-based catalyst) are classified into a decrease in activity based on reduction of active sites by cohesion of Pd and a decrease in activity based on decomposition and reduction of PdO in an oxidation state which is highly active. Due to the quite stable surface of the $Al_2O_3$ as mentioned above, cohesive properties along with the precious metal flux in using the catalyst cannot be suppressed, and an oxidation state of PdO on the surface of $Al_2O_3$ cannot be stabilized. Therefore, when $Al_2O_3$ is used as a support, the activity is extremely decreased, whereby an excellent endurance of a purification catalyst for exhaust gas cannot be realized.

SUMMARY OF THE INVENTION

The present invention was made in light of the above various findings, and it is hence an object thereof to provide a purification catalyst for exhaust gas, specifically in which activity for each precious metal is improved by effectively utilizing the precious metal without incurring a high production cost, whereby endurance is improved.

The present inventors have intensively researched purification catalysts for exhaust gas, in which activity for each precious metal is improved at a low cost, whereby endurance can be improved. As a result, it was found that when Pd is supported on a composite oxide in which a rational formula is $MXO_3$ (M: alkali metal element, X: an element in group 5 in periodic table) and a crystal structure is a perovskite structure, the production cost can be reduced and improvement of catalyst activity can be realized, whereby the endurance of the purification catalysts for exhaust gas can be improved. The present invention was made in light of the above findings.

That is, a purification catalyst for exhaust gas of the present invention has a composite oxide supporting Pd, the composite oxide has a rational formula $MXO_3$ in which M is an alkali metal element and X is an element in group 5 in periodic table, and a crystal structure of the composite oxide is a perovskite structure.

According to the present invention, by supporting Pd on a composite oxide having a rational formula $MXO_3$ in which M is an alkali metal element and X is an element in group 5 in periodic table, poisonous gases, for example, NO, CO, and HC in the exhaust gas can be effectively purified from an initial using stage to an using stage in a high temperature (980° C.). Additionally, purification performance specifically for CO and HC in the poisonous gases can be extremely improved in the purification catalyst for exhaust gas of the present invention. Hereinafter, a reason in which components in the purification catalyst for exhaust gas of the present invention are restricted will be respectively explained.

That is, in a composite oxide used in the purification catalyst for exhaust gas of the present invention, a rational formula is $MXO_3$ in which M is an alkali metal element and X is an element in group 5 in periodic table, and elements constituting the composite oxide are a monovalent alkali metal element, a pentavalent element in group 5 in periodic table, and oxygen. A reason that X (an element in group 5 in periodic table) is used as an element constituting the purification catalyst for exhaust gas of the present invention is as follows. That is, the pentavalent state is the most stable in X. However, X can be changed in various valences from bivalent state to pentavalent state. For example, Nb is listed as an element included in X. Oxidants, for example, $O_2$ and $NO_x$, and reductants, for example, CO, HC, and $H_2$ are contained in the exhaust gas. Therefore, when Nb constituting $NbO_3$ is exposed to the exhaust gas, Nb is oxidized or reduced to change the valences thereof, whereby oxygen defects are generated. The oxygen defects make lattice oxygen mobile, whereby the oxygen can be absorbed and emitted at the surface of the catalyst. Due to the effect mentioned above, $MNbO_3$ provides Pd supported on the surface of the $MNbO_3$ with oxygen, or $MNbO_3$ absorbs oxygen from PdO. Pd exists as PdO in an exhaust gas atmosphere, oxidation of Pd and reduction of PdO are repeated to purify the exhaust gas. In purification, a cycle of oxidation and reduction of PdO is promoted due to provision and absorption of oxygen by $MNbO_3$ which is a support, whereby purification activity of the exhaust gas can be improved.

Moreover, a reason in which M (alkali metal element) is used as an element constituting the purification catalyst for exhaust gas of the present invention is as follows. That is, while M (alkali metal element) exhibits an alkaline reaction, $NO_x$ in the exhaust gas exhibits an acidic reaction. Due to strong interaction of alkaline component and acidic component, $NO_x$ in the exhaust gas atmosphere is strongly attracted to M in $MXO_3$, whereby $NO_x$ is condensed on a surface of $MXO_3$. Therefore, a condensed $NO_x$ exists in the vicinity of the Pd which is an active site and is supported on $MXO_3$, whereby purification reaction of $NO_x$ is promoted. Due to high reactivity of the condensed $NO_x$, both purification reaction of $NO_x$, and purification reaction of CO and HC are promoted.

Furthermore, a reason that a crystal structure of a purification catalyst for exhaust gas of the present invention is a perovskite structure is as follows. That is, $MXO_3$ having a perovskite structure is extremely thermally stable. Therefore, even after $MXO_3$ is exposed to an atmosphere at a high temperature of about 1000° C., the perovskite structure is not destroyed and decrease in the surface-to-weight ratio is small. Therefore, a crystal structure of the $MXO_3$ is predetermined to be a perovskite structure, whereby implant and cohesion of Pd can be suppressed along with decrease in the surface-to-weight ratio.

As mentioned above, in the purification catalyst for exhaust gas of the present invention, a promotion effect of oxidation and reduction of PdO by X (an element in group 5 in periodic table), a condense effect of $NO_x$ by M (alkali metal element), and a maintenance effect of endurance by perovskite structure can be combined, whereby activity of the purification catalyst for exhaust gas in reaction can be extremely improved in comparison with conventional catalyst. That is, according to the purification catalyst for exhaust gas of the present invention, the activity for each precious metal can be improved by effectively utilizing the precious metals, whereby endurance can be improved. Additionally, this effect can be realized after endurance running at a high temperature of about 1000° C.

DETAIL DESCRIPTION OF THE INVENTION

Figure 1:
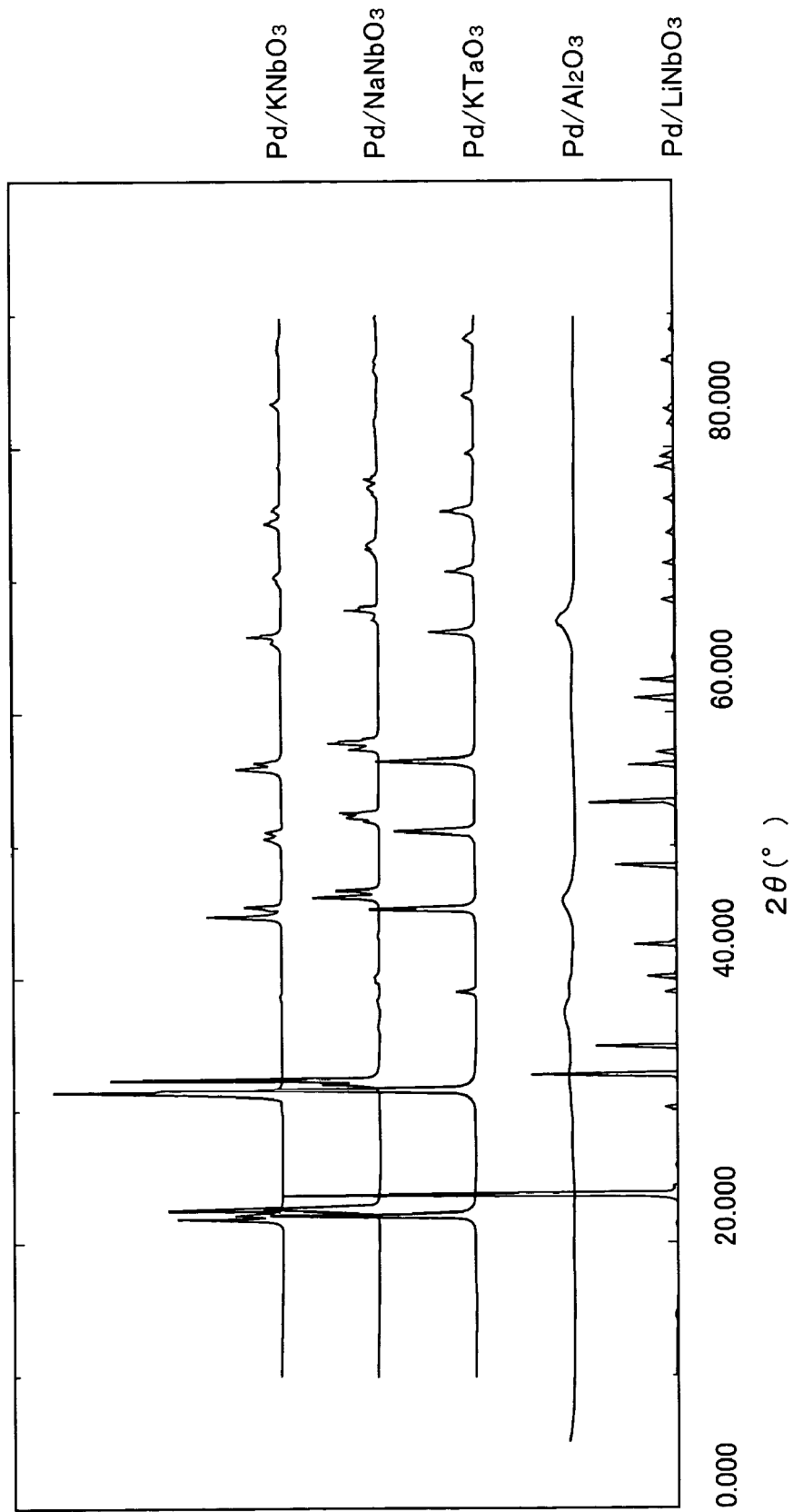
FIG. 1 is a XRD spectrum of a crystal system in $Pd/KNbO_3$, $Pd/NaNbO_3$ and $Pd/KTaO_3$ as representative examples of the present invention, and $Pd/Al_2O_3$ and $Pd/LiNbO_3$ as representative examples of the conventional technology.

Hereinafter, the present invention will be concretely explained by the following Manufacturing Examples.

Production of Composite Oxides as Support

MANUFACTURING EXAMPLE 1

Predetermined amounts of $K_2CO_3$ and $Nb_2O_5$ were mixed by a wet blending in a mortar to obtain a mixed material. The mixed material was moved to an aluminum crucible, and was heated to 800° C. at a rate of 5° C./min in a muffle kiln, and a heat treatment was performed at 800° C. for 10 hours. Owing to the heat treatment, a composite oxide of which the composition was $KNbO_3$ was obtained.

MANUFACTURING EXAMPLE 2

A composite oxide of which the composition was $NaNbO_3$ was obtained in a manner similar to Manufacturing Example 1.

MANUFACTURING EXAMPLE 3

A composite oxide of which the composition was $KTaO_3$ was obtained in a manner similar to Manufacturing Example 1.

MANUFACTURING EXAMPLE 4

A commercially available $Al_2O_3$ (AF115 produced by Sumitomo Chemical Co., Ltd.) was prepared.

MANUFACTURING EXAMPLE 5

A composite oxide of which the composition was $LiNbO_3$ was obtained in a manner similar to Manufacturing Example 1.

Support of a Precious Metal

The following treatment was respectively performed with the composite oxides of the Manufacturing Examples 1 to 5. That is, a predetermined amount of a palladium nitrate-dihydrate was dissolved in ion-exchanged water, whereby a palladium nitrate solution was obtained. The palladium nitrate solution and a predetermined amount of composite oxides ($KNbO_3$, $NaNbO_3$, $KTaO_3$, $Al_2O_3$ and $LiNbO_3$) powder were put in an eggplant-shaped flask, and while the flask was evacuated by a rotary evaporator, a mixture of the solution and the powder was evaporated and solidified in a hot bath at 60° C. After heating up to 250° C. at a rate of 2.5° C./min in a muffle kiln, the temperature of the mixture was further raised to 750° C. at a rate of 5° C./min, and the mixture was held at 750° C. for 3 hours. As a result, catalyst powders of Manufacturing Example 1 to 5 in which PdO is impregnated and supported on the above-mentioned composite oxides or oxide were obtained.

Differences in crystal system among catalysts powders of Manufacturing Examples 1 to 5 were investigated. FIG. 1 is the result of the examination of the crystal systems of these catalyst powders by XRD spectrum. According to FIG. 1, judging from position and size of peaks of the respective XRD pattern, it was found that the same crystal systems are exhibited in the catalysts of the Manufacturing Examples 1 to 3 in which the crystal structure is a perovskite structure. On the other hand, judging from position and size of peaks of the respective XRD pattern, it was found that the different crystal systems from that of Manufacturing Examples 1 to 3 are shown in the catalysts of the Manufacturing Examples 4 and 5 in which the crystal structure is not a perovskite structure.

Estimation of Activity

Next, initial activities and activities after endurance running were estimated for the obtained catalyst powders. The estimation was performed by flowing model exhaust gas of an automobile into catalysts under conditions in which A/F (air-fuel ratio) was substantially 14.6 and SV (stroke volume) was 5000 $h^{-1}$. Endurance running was performed for 20 hours at an endurance running temperature of 980° C. by using model exhaust gas in which A/F (air-fuel ratio) was substantially 14.6. These results are shown in Tables 1 and 2. That is, the Table 1 shows a temperature at which HC, CO, and NO are reduced by 50% in a temperature increase test of catalysts before the endurance running, and a purification rate at 400° C. of catalysts before the endurance running. Moreover, Table 2 shows a temperature at which HC, CO, and NO are reduced by 50% in a temperature increase test of catalysts after the endurance running and a purification rate at 400° C. of catalysts after the endurance running.

TABLE 1

| Manufacturing No. | rational formula | temperature at which HC, CO, and NO are reduced by 50% in a temperature increase test of catalysts before endurance running (° C.) | | | purification rate at 400° C. of catalysts before endurance running (° C.) | | |
| --- | --- | --- | --- | --- | --- | --- | --- |
| | | HC | CO | NO | HC | CO | NO |
| Manufacturing Example 1 | Pd/KNbO$_3$ | 304 | 265 | 232 | 92.6 | 96.5 | 98.6 |
| Manufacturing Example 2 | Pd/NaNbO$_3$ | 335 | 320 | 248 | 90.4 | 94.0 | 98.8 |
| Manufacturing Example 3 | Pd/KTaO$_3$ | 318 | 302 | 231 | 91.8 | 95.8 | 96.2 |
| Manufacturing Example 4 | Pd/Al$_2$O$_3$ | 355 | 337 | 344 | 86.9 | 89.9 | 91.2 |
| Manufacturing Example 5 | Pd/LiNbO$_3$ | 360 | 353 | 239 | 84.4 | 87.5 | 92.4 |

TABLE 2

| Manufacturing No. | rational formula | a temperature at which HC, CO, and NO are reduced by 50% in a temperature increase test of catalysts after endurance running (° C.) | | | purification rate at 400° C. of catalysts after endurance running (° C.) | | |
| --- | --- | --- | --- | --- | --- | --- | --- |
| | | HC | CO | NO | HC | CO | NO |
| Manufacturing Example 1 | Pd/KNbO$_3$ | 366 | 335 | 310 | 79.4 | 90.1 | 94.3 |
| Manufacturing Example 2 | Pd/NaNbO$_3$ | 380 | 364 | 377 | 64.6 | 73.4 | 62.2 |
| Manufacturing Example 3 | Pd/KTaO$_3$ | 368 | 335 | 345 | 75.2 | 86.6 | 82.8 |
| Manufacturing Example 4 | Pd/Al$_2$O$_3$ | 386 | 370 | 311 | 55.2 | 69.8 | 70.2 |
| Manufacturing Example 5 | Pd/LiNbO$_3$ | 411 | 412 | 437 | 31.8 | 41.1 | 24.5 |

According to Tables 1 and 2, the purification catalysts for exhaust gas of the Manufacturing Examples 1 to 3 exhibit excellent temperatures at which HC, CO, and NO are reduced by 50% at any time before and after the endurance running, and the purification catalysts for exhaust gas of the Manufacturing Example 1 to 3 exhibit excellent purification rates at 400° C. of catalysts before and after the endurance running. The reasons for these results are that the purification catalysts for exhaust gas of the Manufacturing Examples 1 to 3 are made by supporting Pd on the KNbO$_3$, NaNbO$_3$, or KTaO$_3$. Therefore, a promotion effect of oxidizing and reducing PdO by an element in group 5 in periodic table, a condense effect of NO$_x$ by an alkali metal element, and a maintenance effect of endurance by a perovskite structure are all and well demonstrated, whereby increase in activity for each precious metal by effectively utilizing the precious metal can be realized.

On the other hand, the purification catalysts for exhaust gas of the Manufacturing Examples 4 and 5 does not exhibit excellent temperatures at which HC, CO, and NO are reduced by 50% at any time before and after the endurance running, and the purification catalysts for exhaust gas of the Manufacturing Examples 4 and 5 does not exhibit excellent purification rate at 400° C. of catalysts before and after the endurance running. The reasons for these results are as follows. In the Manufacturing Example 4, Al$_2$O$_3$ is a stable compound which does not interact with a supported precious metal, whereby activity of Pd itself is not improved. In the Manufacturing Example 5 in which the crystal structure is an ilmenite structure, the crystal system is different from that of Manufacturing Examples 1 to 3, whereby the existence of a state of electrical charge between constituting atoms is not unstable in comparison with that of Manufacturing Examples 1 to 3 in which the crystal structure is a perovskite structure.

The purification catalyst of exhaust gas of the present invention can be applied to an internal combustion engine of an automobile or the like in which it is required to simultaneously and effectively purify and reduce nitrogen oxide (NOx), carbon hydride (HC), and carbon monoxide (CO) contained in an exhaust gas.

What is claimed is:

1. A purification catalyst for exhaust gas, comprising a composite oxide supporting Pd, the composite oxide consists of only a rational formula $MXO_3$ in which M is only Na or K and X is only an element in group 5 in the periodic table, and the composite oxide being a crystal structure of a perovskite structure.

2. The purification catalyst for exhaust gas according to claim 1, wherein the X is Nb or Ta.

3. The purification catalyst for exhaust gas according to claim 1, wherein the composite oxide supporting Pd comprises Pd supported on a surface of the composite oxide.

4. The purification catalyst for exhaust gas according to claim 1, wherein X is Nb.

* * * * *